United States Patent [19]

Horowitz

[11] 3,929,800

[45] *Dec. 30, 1975

[54] POLYMER GRAFTING ONTO HYDROCARBON LIQUIDS

[75] Inventor: Carl Horowitz, Brooklyn, N.Y.

[73] Assignee: Polymer Research Corporation of America, Brooklyn, N.Y.

[ * ] Notice: The portion of the term of this patent subsequent to Oct. 17, 1989, has been disclaimed.

[22] Filed: July 27, 1972

[21] Appl. No.: 275,627

Related U.S. Application Data

[63] Continuation of Ser. No. 888,905, Dec. 29, 1969, abandoned, which is a continuation-in-part of Ser. No. 834,489, June 18, 1969, Pat. No. 3,698,931.

[52] U.S. Cl............. 260/290 R; 252/49.8; 252/50; 252/51; 252/52 R; 252/54; 252/54.6; 252/56 R; 252/56 D; 252/58; 252/59; 260/239.3 P; 260/246 B; 260/315; 260/326.5 C; 260/348 A; 260/465.8 R; 260/485 F; 260/485 G; 260/486 R; 260/488 H; 260/485 J; 260/488 J; 260/537 R; 260/485 N; 260/668 R; 260/677 R; 260/537 N; 260/680 B; 260/683.64; 260/561 R; 260/926; 260/561 N; 260/567.6 P; 260/576; 260/578; 260/607 B; 260/615 P; 260/635 R; 260/653.1 R; 260/654 R; 260/658 C

[51] Int. Cl.²......................................... C07C 69/52
[58] Field of Search.......... 260/485, 17.46 C, 290 R

[56] References Cited
UNITED STATES PATENTS

| | | | |
|---|---|---|---|
| 2,419,090 | 4/1947 | Rainard | 260/82.5 |
| 3,232,903 | 2/1966 | Schmidle | 260/33.6 |

*Primary Examiner*—Lorraine A. Weinberger
*Assistant Examiner*—E. Jane Skelly
*Attorney, Agent, or Firm*—Steinberg & Blake

[57] ABSTRACT

Monomers are polymerized and simultaneously grafted onto hydrocarbon liquids, so that the resulting hydrocarbon liquids with the polymerized monomers grafted thereto have improved properties as compared to the original hydrocarbon liquids. The grafting is accomplished by contacting the hydrocarbon liquid with a grafting liquid containing a silver salt, a polymerizable monomer and a catalyst which is adapted to activate the monomer to polymerization by itself being activated by metallic silver. The silver ion is reduced by the hydrocarbon liquid and the resulting metallic silver activates the catalyst which in turn activates the polymerization reaction so that the polymerization takes place and the formed polymer is grafted onto the hydrocarbon liquid.

3 Claims, No Drawings

3,929,800

POLYMER GRAFTING ONTO HYDROCARBON LIQUIDS

CROSS-REFERENCE TO RELATED APPLICATION

This application is a continuation of co-pending application Ser. No. 888,905, filed Dec. 29, 1969 now abandoned, which is a continuation-in-part and improvement of my copending application Ser. No. 834,489, filed June 18, 1969, for "Method of Grafting Polymerizable Monomers Onto Substrates", now U.S. Pat. No. 3,698,931.

BACKGROUND OF THE INVENTION

In my copending application Ser. No. 834,489, I described a method for the intimate bonding of polymeric materials to various objects, which in the application are referred to as "substrates." According to the method, a non-metallic body is contacted with a solution containing a silver salt and a polymerizable composition including a catalyst which is adapted to be activated to polymerization by silver oxide or colloidal silver, whereby the non-metallic object causes reduction of the silver salt to colloidal silver or silver oxide which is formed at and dispersed and bonded to the object, and thereupon activates the catalyst to cause polymerization, so that the resulting polymer is bonded directly to the non-metallic object at the sites of deposition of the silver. This results in an intimate bonding of the polymer to the object. All of the substrates disclosed in said application are solid objects, or objects formed of solid material.

I have now discovered that the same basic method, quite surprisingly, in view of the fact that it is precipitated metallic silver or silver oxide which activates the polymer to cause polymerization, that the same method can be used to graft polymers onto liquid hydrocarbons, in order to improve the properties thereof. Various different properties of different liquid hydrocarbons, both saturated and unsaturated, can be improved in various ways by the grafting of different polymers thereon, and it is to this improvement that the present invention relates.

SUMMARY OF THE INVENTION

The present invention mainly comprises the contacting of a liquid hydrocarbon with a medium of a silver salt and a polymerizable composition including a catalyst which is activated by metallic silver and which upon activation causes polymerization of the polymerizable composition, whereby the silver salt is reduced by the liquid hydrocarbon to silver which while precipitating activates the catalyst, whereby polymerization occurs and the resulting polymer becomes bound directly to the liquid hydrocarbon.

It is accordingly a primary object of the present invention to provide a method of bonding polymers to liquid hydrocarbons in order to improve various properties thereof.

It is another object of the present invention to provide a single stage and method for grafting polymerized material onto liquid hydrocarbons.

It is yet a further object of the present invention to provide a method of improving various properties such as viscosity, viscosity index, pour point, resistance to oxidation, etc. of various different hydrocarbons for various different purposes.

Other objects and advantages of the present invention will be apparent from the further reading of the specification and of the appended claims.

In accordance with the method of the present invention, it will be explained in reaction equations which are set forth below, the silver ions are reduced by hydrocarbon molecules in the liquid hydrocarbon with radicals being formed as a result. The polymerizable monomer attaches itself to these radical sites, thus forming an intimate covalent bond with the liquid hydrocarbon molecules, which bonding is extremely strong.

The overall reaction is believed to proceed in accordance with the following equations, in which a vinyl monomer is taken for exemplatory purposes:

(1)  $Ag^+ + RH \rightarrow R\cdot + Ag^o + H^+$
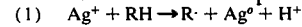
R — Liquid hydrocarbon
R• — Liquid hydrocarbon with a radical
$Ag^o$ — Silver metal (2) (a) 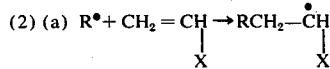

(b) 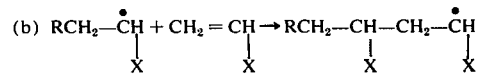

etc.
X — pendant groups
(3)  $Ag^o + HOOH \rightarrow Ag^+ + OH + OH\bullet$
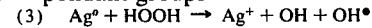

Reaction 1 gives a radical site on the liquid hydrocarbon by reducing silver to metal and oxidizing the liquid hydrocarabon substrate. Silver is a powerful oxidizing agent (it reduces readily) and forms particles which are substantive to the liquid hydrocarbon substrate.

In the reaction No. 2 the vinyl monomer molecule attaches itself at the radical site, forming a perfect linkage. The second vinyl monomer molecule attaches itself to the first, etc., thus forming a side chain.

In the reaction No. 3, the peroxide type catalyst reacts with silver metal, giving hydroxyl radicals and silver ions can now repeat the entire cycle from the beginning. Thus, silver acts as a true catalyst for grafting, yet by itself it cannot polymerize the monomer on its own.

The above method can be used both on saturated hydrocarbons and on unsaturated hydrocarbons, including fractions with a high degree of unsaturation. The unsaturated hydrocarbons can be particularly used for the production of high quality lubricating oils which do not require an additive for improvement of the viscosity, viscosity index, pour point, and resistance to corrosion and oxidation. The result is a high grade lubricating oil.

Among the various types of hydrocarbons that can be used as substrates for the grafting of polymers thereto, without limitation, but for exemplatory purposes only, are:

1. Dimers, Trimers, Tetramers etc. of propylene
2. Dimers, Trimers etc. of isobutylene
3. Dipentene
4. Postpyrolytic gasoline
5. Catalytic cracking fractions
6. Fractions from coking processes, and many others.

The invention is applicable to the use of any polymerizable monomers, such as:

Methyl Methacrylate (also oleyl, α-decyl, octadecyl, cyclohexyl, n-butyl, amyl, cetyl acrylates and others), acrylic acid and its derivatives (also butyl, amyl, octyl hexadecyl etc.), methylacrylate vinyl acetate, vinyl chloride, vinylidene chloride, isobutylene, vinyl ethers, acrylonitrile, maleic acid and esters, crotonic acid and esters, itaconic acid and its esters, allylic esters, allyl vinyl esters, vinylpyridine and its derivatives (also 2-methyl-5-vinyl pyridine), bisbetachloro ethyl vinyl phosphonate, chloroprene, isoprene, dimethylaminethyl, methacrylate, styrene, 1,3-butylene dimethacrylate, isooctyl vinyl ether, acrylamide, glycidyl methacrylate, N-vinyl caprolactam, N-vinyl pyrrolidone, N-vinyl carbazole, sodium styrene sulfonate, sodium vinyl sulfonate, bis(betachloroethyl) vinyl phosphonate, cetyl vinyl ether, divinylether of ethylene glycol, divinyl ether of butanediol, vinyl toluene, vinyl acetate, octadecyl vinylether. Also mixtures of 2 or more monomers can be used. The monomeric tertiary amines can be quaternized with benzyl chloride, ethyl iodide, methyl or ethylsulfate. Conversely, monomeric chlorides can be quaternized with tertiary amines to give quaternary ammonium compounds. Some suitable tertiary amines are: N-ethyl morpholine, pyridine, cetyldimethyl pyridine, dimethyl aniline, etc.

The monomers can be copolymerized with cross-linking agents such as butadiene, divinylbenzene or maleic anhydride.

Additional monomers are:

mono, -di tri-, tetra-and poly-ethylene glycoldimethacrylate, methylvinylpyridine, allylacrylate and methacrylate, allychloride, allylacohol, perfluoro alkyl acrylates and methacrylates, p-amino-styrene, vinyl bromide and vinylidene bromide trimethylvinylbenzylammonium chloride. vinyltrifluoroacetate (followed by hydrolysis to poly-vinyl alcohol), diallyl chloromethyl phosphonate, diallyl benzene phosphonate, diallyl dimethyl ammonium chloride, diallyl diethyl ammonium bromide, glycidyl acrylate and methacrylate, ethylene glycol, -diethyleneglycol — and polyethylene glycol acrylates and methacrylates, vinyl perfluoro octaneate, etc.

The monomer can be dissolved in a suitable solvent such as dimethylformamide, tetrahydrofurane, tetrahydrofurfuryl alcohol, dimethylsulfoxide, water, methyl, ethyl or isopropyl alcohol, acetone, methyl ethyl ketone and ethyl acetate. Also mixtures of two or more of the above can be used.

Among the catalysts which can be used are ammonium persulfate, hydrogen peroxide, tert-butylhydroperoxide, ditert-butyl peroxide, benzoyl peroxide, dicumyl peroxide, lauroyl peroxide, tert-butyl perbenzoate and peracetic acid.

The concentration of the silver salt can vary within a wide range, though it is preferably between about 0.0001 to about 0.01 percent. The amount of about 0.001 percent or lower is preferable for reasons of economy.

The concentration of the monomer in the solution can likewise vary within practically any limits, for example, between 0.1 and 50 percent, though the preferred concentration is between about 1–20 percent.

A soluble silver salt can be used, including silver nitrate, silver acetate, silver sulfate, silver carbonate and silver perchlorate. Silver perchlorate is the most preferred since the method of the present invention is carried out in organic medium, and silver perchlorate is soluble in organic solvents.

Depending on the monomer used, and the particular liquid hydrocarbon, various improvements in properties can be accomplished. Thus, for example, in the case of lubricating oils, the resulting lubricating oils with polymers grafted thereto can be used directly or in admixture with ordinary lubricating oils to provide lubricating oils for internal combustion engines, transmission oil, hydraulic fluids, oils for automatic transmission, greases for bearings and transmission in turbojet and jet engines, and in engines propelled with nuclear energy or by equipment gear exposed to atomic radiation. The following illustrates temperature versus conditions for jet engines with speeds of Mach. 2 or higher:

| | Speed in Mach. | | |
|---|---|---|---|
| | Up to 2 | Up to 3 | Up to 4 |
| Bearings Temperature °C. | 204°C | 315 | 425 |
| Transmission Temperature °C | 121 | 204 | 315 |
| Maximum temperature °C. | 315–426 | 426–538 | 538–649 |
| Entrance Temperature °C. | 135 | 204 | 315 |
| Exit Oil Temperature °C. | 195 | 260 | 371 |

In the case of hydrocarbon fuels, better fuel characteristics can be achieved by the method of the present invention. Thus, in the case of higher octane gasolines it is possible to lower the flash point. It is possible to graft an oxidizing monomer that helps oxidation or burning. More uniform burning can be achieved. Monomers can be grafted to minimize or reduce smog formation by inhibiting the formation of nitrogen and sulphur oxides and carbon monoxide or other harmful exhausts, not only by assuring more uniform and therefore complete combustion, but also by chemical reaction with or to prevent formation of such harmful exhaust products. It is possible by grafting to cause jelling or solidification of the fuels, at least temporarily, for various different purposes.

DESCRIPTION OF PREFERRED EMBODIMENTS

The following examples are given to further illustrate the present invention. The scope of the invention is not, however, meant to be limited to the specific details of the examples.

EXAMPLE 1

100 g Dipentene
10 g Oleyl Methacrylate
2 g tert - Butylperbenzoate
0.1 g Dimethyl Aniline
0.01 g Silver perchlorate dissolved in Dipentene.

Heating of the above mixture results in an oil corresponding to SAE 10W/50 with a viscosity index of 150 and a pour point of 25°C.

EXAMPLE 2

150 g Tetrapropylene
8 g Oleyl Mothacrylate
2 g tert - Butylperbenzoate
0.1 g Dimethylaniline
0.01 g Silver perchlorate in Dipentene The above mixture is heated for 48 hours at a temperature of 110°C. There is obtained a lubricating oil corresponding to SAE 20W/40 with a viscosity index of 150 and pour point of − 22°C.

EXAMPLE 3

150 g Postpyrolylic Gasoline (fraction boiling above 180°C.)
8 g Octadecyl Methacrylate
2 g Azoisobutyronitrile
0.1 g Dimethylaniline
0.01 g Silver Perchlorate in Gasoline The above mixture is heated at 110°C. for 48 hours and a lubricating oil is obtained corresponding to SAE 20W/40 with a viscosity index of 155 and a pour point of − 26°C.

EXAMPLE 4

150 g Tetrapropylene
10 g 2 - methyl 5 - vinyl pyridine
1 g tert - Butylperbenzoate
0.1 g Dimethylaniline
0.01 g Silver Perchlorate The mixture is heated at 120°C. for 48 hours and a lubricating oil is obtained corresponding to SAE 10W/30 with a viscosity index of 155 and pour point of 27°C.

While the invention has been illustrated in particular with respect to the grafting of certain polymers on certain liquid hydrocarbons, it is apparent the variations and modifications of the invention can be made without departing from the spirit and scope thereof.

What is claimed is:

1. Method of grafting a polymer onto a liquid hydrocarbon molecule selected from the group consisting of polypropylenes, polyisobutylenes, dipentene and postpyrolytic gasoline in a liquid hydrocarbon medium which comprises contacting said liquid hydrocarbon molecule in said liquid hydrocarbon medium with a solution of a soluble silver salt in an amount of about 0.0001 − 0.01 percent by weight, said solution thus containing silver ions, and also containing a polymerizable composition consisting essentially of a solution in a solvent selected from the group consisting of dimethylformamide, tetrahydrofurane, tetrahydrofurfuryl alcohol, dimethylsulfoxide, water, methyl alcohol, ethyl alcohol, isopropyl alcohol, acetone, methyl ethyl ketone, ethyl acetate and mixtures thereof of a percatalyst selected from the group consisting of ammonium persulfate, hydrogen peroxide, tert-butylhydroperoxide, ditertbutyl peroxide, benzoyl peroxide, dicumyl peroxide, lauroyl peroxide, tert-butylperbenzoate and peracetic acid and a polymerizable monomer in an amount of 0.1 − 50 percent by weight which is activated to polymerization by activation of said percatalyst, said catalyst being activated by metallic silver, whereby the silver ions of said silver salt are reduced by said liquid hydrocarbon molecule to metallic silver which activates said catalyst, whereby polymerization occurs and the resulting polymer is bound directly to said liquid hydrocarbon molecule, thereby forming an intimate bonding of the polymer to said liquid hydrocarbon molecule in said liquid hydrocarbon medium, thus obtaining a liquid hydrocarbon composition with properties different from those of the original liquid hydrocarbon.

2. Method according to claim 1 wherein said silver salt is dissolved in the same liquid hydrocarbon medium in which the polymer is to be bound.

3. Method according to claim 1 wherein said silver salt is silver perchlorate which is dissolved in the same liquid hydrocarbon medium in which the polymer is to be bound.

* * * * *